June 17, 1952     A. DOUGLAS     2,601,104

JET PROPULSION AND CONTROL MEANS THEREFOR

Filed Sept. 10, 1946     3 Sheets-Sheet 1

Aubrey Douglas
By Fraser, Myers & Manley
Att'ys

June 17, 1952   A. DOUGLAS   2,601,104
JET PROPULSION AND CONTROL MEANS THEREFOR
Filed Sept. 10, 1946   3 Sheets-Sheet 2

Aubrey Douglas
By Fraser, Myers & Manley
Att'ys

June 17, 1952          A. DOUGLAS          2,601,104
JET PROPULSION AND CONTROL MEANS THEREFOR
Filed Sept. 10, 1946          3 Sheets-Sheet 3
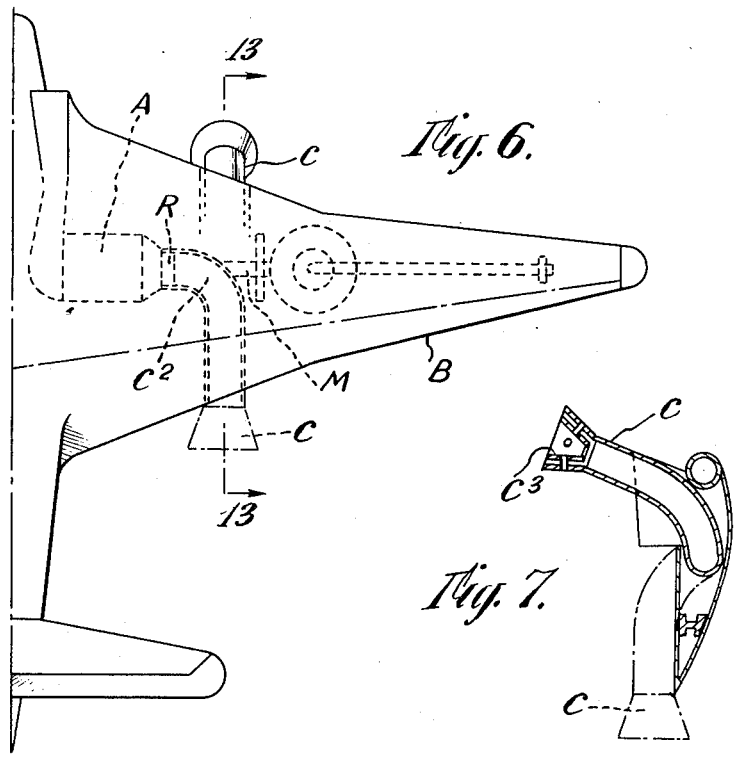
Aubrey Douglas
By Fraser, Myers & Manley
Att'ys Patented June 17, 1952

2,601,104

UNITED STATES PATENT OFFICE 2,601,104

JET PROPULSION AND CONTROL MEANS THEREFOR

Aubrey Douglas, Saltford, England

Application September 10, 1946, Serial No. 695,839
In Great Britain October 15, 1945

8 Claims. (Cl. 244—12)

This invention relates to jet propulsion for aircraft and is particularly concerned with a method of and means for controlling the propulsive effort created by the efflux or jet whereby a reverse action is obtainable.

According to the invention, a method of controlling the reaction jet of a jet propelled or partially jet propelled aircraft consists in baffling or reducing the effective area of the jet nozzle and/or diverting partially or otherwise the combustion gases in a direction other than the normal direction of flow.

It is to be understood the aforesaid method is additional to the normal means of controlling the efflux.

The invention also comprises means for baffling the efflux from a jet nozzle or for reducing the effective area of said nozzle and diverting the combustion gases, by means, for example, of ducts or conduits, in a direction other than that of their normal flow whereby the reaction created may be utilized for braking purposes, for assisting take off or landing or other control purposes.

In order that the invention may be clearly understood and readily carried into effect, reference is directed to the accompanying drawings, wherein:

Fig. 6 is a plan view of a wing and part of a fuselage of a jet propelled aircraft showing an application of the invention thereto and embodying a modified form of the invention.

Fig. 7 is a section on the line 13—13, Fig. 6.

The drawings are essentially diagrammmatic and the same reference characters are used throughout the figures for the same or equivalent parts.

Figure 1:
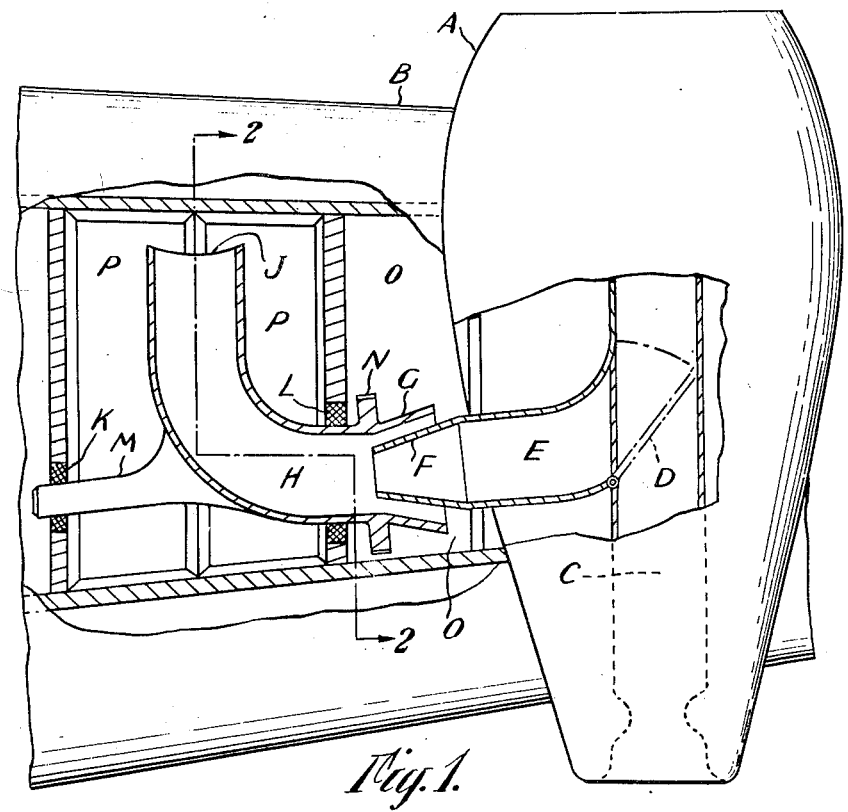
Fig. 1 illustrates diagrammatically in plan view partly in section, a part of an aircraft wing embodying the invention.
Figure 2:
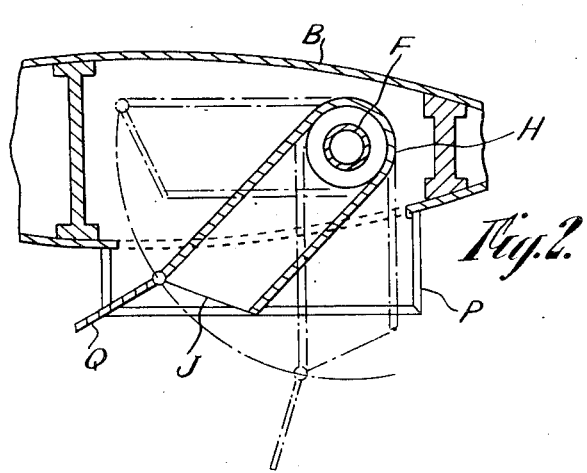
Fig. 2 is a section on the lines 2—2, Fig. 1, looking in the direction of the arrows.

The form of the invention illustrated in Figs. 1 and 2 of the drawings is applied to an aircraft in which a jet propulsion unit A is mounted in a wing B and consists in disposing in the main jet tube C, a baffle or diaphragm D associated with means (not shown on drawings) whereby it may be gradually introduced into the gas stream or closed thereon to divert its force, the cross-section of the jet tube being suitably shaped to receive the baffle. The combustion gases so diverted are lead by one or more ducts or conduits E, each having an outlet F to the inlet G of a discharge conduit H, the outlet J for the said conduit H pointing in any required direction, for example, forward and/or downward for the purpose of checking the speed of the aircraft or increasing its lift.

The outlet J of the conduit H is directionally controlled so that the resultant force thereof will act in the plane or in planes parallel to the plane of symmetry of the aircraft, so that the diverted gases may be directed towards the ground and forward or backward as required for increasing the lift at braking or taking off respectively as illustrated in Fig. 2. For this purpose, the conduit H is mounted in bearings K, L, a trunnion M integral with the conduit H resting in the bearing K and the inner end of the conduit H being mounted in the bearing L. In order to rotate the conduit H along its path of movement, a pinion N is secured to the inner end of the conduit H, a suitable means being furnished to actuate the said pinion to effect the required disposition of the conduit H.

The conduit E may be lead straight into the conduit H or as an optional feature as shown in Fig. 1 of the drawings, the inner end G of the conduit H may be splayed to receive the outlet end F of the conduit E, thus introducing an ejector drawing air, for example, from a boundary layer into the chamber O and from there into the conduit H. The conduit H is normally housed within the wing structure, the lower face of which is fitted with doors P which are dropped when it is desired to bring the conduit into position for operative purposes. The outlet J of the conduit may be furnished with a closure Q.

The invention is applicable to all forms of jet propulsion units whether mounted in the aircraft wings or in the fuselage of an aircraft, the ducts or conduits being disposed in the most suitable position in relation to the propulsion unit subject to the inlets being arranged in the discharge conduit and the outlet in such a position as to create a rectionary effort, whether directed in axial opposition to the normal jet flow or at an angle thereto, the resultant force being utilized as a means of control.

Figure 3:
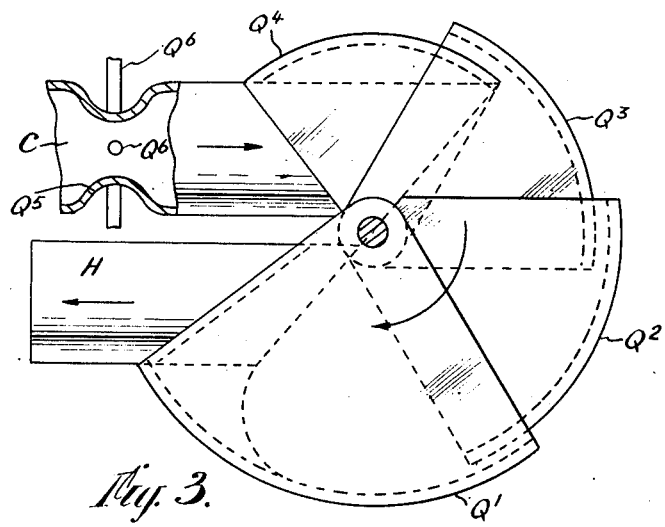
Figs. 3, 4, 5 illustrate a side elevation, a longitudinal section and a cross-section along the line 11—11 of Fig. 4 respectively of a modified form of a diversion means according to the invention.
Figure 4:
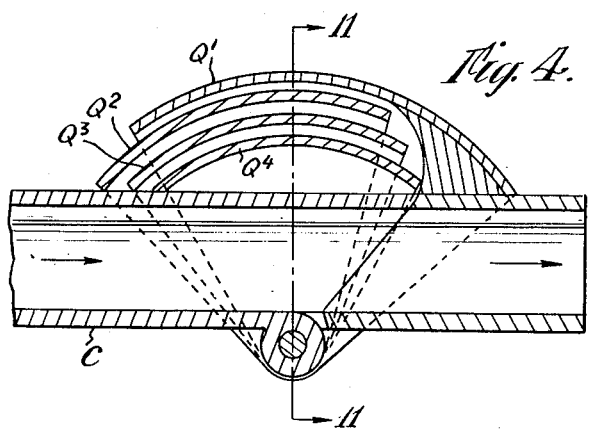
Figure 5:
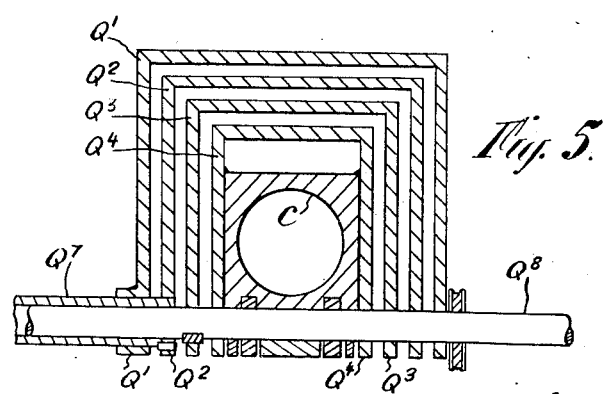

Figs. 3, 4, 5 show a modification of the invention in which the jet nozzle C has an elbow joint Q formed of a number of members which are capable of nesting together to form a through conduit (see Fig. 4) or being diverted by concerted or independent operation as shown in Fig. 3 to give a discharge in the reverse direction or in a direction determined by a path of 180° in a plane or in planes parallel to the plane of symmetry of the aircraft through which the nozzle can be turned.

The elbow joint Q comprises four members $Q^1$, $Q^2$, $Q^3$, $Q^4$, of which $Q^1$ and $Q^4$ are fixed to the jet nozzle elements H and C, respectively, permitting the intermediate members $Q^2$ and $Q^3$ to be independently operated to an open position to enable quick recovery of the normal jet flow to a comparatively straight line course. Further, all or one of the members $Q^1$, $Q^2$ and $Q^3$ may be slotted to permit partial flow of the gases to reduce the initial pressure at the outlet of the nozzle and obtain a smooth braking effect when the nozzle is brought into use. In effect the elbow constitutes a valve controlling the gas flow. The jet nozzle conduit may also be reduced to provide a Venturi portion as at $Q^5$ to which inlets $Q^6$ are made from any suitable surface of the aircraft.

Figure 5 indicates diagrammatically a method of operating the several parts of the elbow. In this figure $Q^1$ is fixed to the conduit H and operable therewith, $Q^2$ is secured to a sleeve $Q^7$, and $Q^3$ to a shaft $Q^8$, the member $Q^4$ being free of the shaft and secured to the jet nozzle.

Figs. 6 and 7 illustrate an arrangement in which the jet propulsion unit A is mounted in a wing B transversely to the thrust and drag line, the nozzle C having an elbow part $C^2$ which is mounted in a pivotal bearing M such as described with reference to Fig. 1, the inlet end of the discharge nozzle being mounted for rotation in a gland R. The normal position of the discharge nozzle is as indicated in dotted lines in the Figs. 12 and 13, whereas the braking position of the discharge nozzle is indicated in full lines in these two figures. The outlet of the discharge nozzle is fitted with a diffusion cone $C^3$, this cone may be adjustable, for example, axially slidable or can be rectangular and provided with adjustable louvres.

Broadly speaking, the invention improves the controllability of jet propelled or partially jet propelled aircraft by two methods, one is to decrease the speed at which the machine is airborne, the other is to increase the lift whereby the machine becomes and remains airborne by diverting the normal jet flow to produce two thrust components, one reacting horizontally forward to induce a rearward braking reaction in the machine, the other acting vertically downwards and thereby generating an increased lifting force.

The invention may comprise any number or arrangement of ducts of any suitable cross-section or of variable cross-sectional area, whereby the velocity of the effluent in the conduits may be accelerated or retarded as desired.

Boundary layer tapping is particularly effective when the propulsion unit is running at full speed and is most required when the aircraft is travelling at a comparatively slow speed, for example, at landing; a slow running aircraft and a fast running engine is thus made possible by the deflection of the jet stream.

What I claim and desire to secure by Letters Patent is:

1. Apparatus for controlling the reaction of a propelling jet in a rigid wing aircraft, comprising a jet tube mounted approximately parallel to the line of flight, means for diverting the flow of at least part of the combustion gases from the jet tube to cause them to move in a direction other than normal, a discharge conduit associated with the jet tube adapted for receiving the diverted gases, the discharge outlet of said discharge conduit being selectively movable about an axis in an arc of approximately 180°, in a plane substantially perpendicular to the plane of the wing for directionally controlling the discharge of gases from the conduit to effect, in at least one position of the discharge conduit, a braking reaction on the aircraft.

2. Apparatus according to claim 1, wherein in at least another position of the discharge conduit, a braking and lifting reaction on the aircraft is effected.

3. Apparatus according to claim 1, wherein the discharge end of the discharge conduit is movable in a plane parallel to the plane of symmetry of the aircraft.

4. Apparatus according to claim 1, wherein the means for diverting the flow of at least part of the gases, is a valve.

5. Apparatus according to claim 1, wherein the discharge conduit is mounted for pivotal movement.

6. Apparatus according to claim 1, wherein the discharge conduit is mounted for pivotal movement and comprises an elbow joint formed of a number of members capable of nesting together.

7. Apparatus according to claim 1, wherein the discharge conduit is mounted within an aircraft wing structure and the outlet of said conduit, in controlled operative position, is at the under side of the wing structure.

8. Apparatus according to claim 1, wherein the reaction generated by the diversion of the jet passes through a point between the leading and trailing edges of the wing.

AUBREY DOUGLAS.

REFERENCES CITED

The following references are of record in the file of this patent:

UNITED STATES PATENTS

| Number | Name | Date |
|---|---|---|
| Re. 23,198 | Anxionnaz | Feb. 21, 1950 |
| 141,039 | Dow | July 22, 1873 |
| 141,340 | Evans | July 29, 1873 |
| 514,527 | Wauters | Feb. 13, 1894 |
| 1,382,535 | Offen | June 21, 1921 |
| 1,629,767 | Valdés | May 24, 1927 |
| 1,642,752 | Landon | Sept. 20, 1927 |
| 1,714,917 | Martin | May 28, 1929 |
| 1,813,189 | Moore | July 7, 1931 |
| 2,024,274 | Campini | Dec. 17, 1935 |
| 2,280,835 | Lysholm | Apr. 28, 1942 |
| 2,420,323 | Meyer | May 13, 1947 |
| 2,486,272 | Gazda | Oct. 25, 1949 |

FOREIGN PATENTS

| Number | Country | Date |
|---|---|---|
| 432,727 | France | Oct. 11, 1911 |